United States Patent [19]

Stratton

[11] Patent Number: 5,058,358

[45] Date of Patent: Oct. 22, 1991

[54] HANGER BRACKET APPARATUS FOR SECURING A JOIST MEMBER TO AN ELEVATED VERTICAL SUPPORT SURFACE

[75] Inventor: Paul A. Stratton, Villa Ridge, Mo.

[73] Assignee: Midwest Industries Ltd., Villa Ridge, Mo.

[21] Appl. No.: 566,606

[22] Filed: Aug. 10, 1990

[51] Int. Cl.$^5$ ................................................ E04B 1/24
[52] U.S. Cl. ........................................ 52/702; 52/547; 52/704; 248/214; 403/232.1
[58] Field of Search ................. 52/547, 578, 579, 702, 52/704, 712; 403/232.1, 403; 248/214

[56] References Cited

U.S. PATENT DOCUMENTS

| | | | |
|---|---|---|---|
| 2,317,015 | 4/1943 | Allen | 52/547 |
| 2,511,083 | 6/1950 | Small | 52/547 |
| 3,954,248 | 5/1976 | Barber | 249/211 |
| 4,124,962 | 11/1978 | Lancelot, III et al. | 52/702 |
| 4,223,866 | 9/1980 | Black | 249/211 |
| 4,422,792 | 12/1983 | Gilb | 403/232.1 |
| 4,584,813 | 4/1986 | Hudson | 52/702 |

*Primary Examiner*—Richard E. Chilcot, Jr.
*Assistant Examiner*—Kien Nguyen
*Attorney, Agent, or Firm*—Rogers, Howell & Haferkamp

[57] ABSTRACT

A bracket apparatus having a general U-shaped configuration with spaced front and back plates interconnected by a bottom plate. An angled plate extends upward from the front plate of the bracket. One or more of the hanger bracket apparatus are secured to the support surface. A header joist at the proximal end of the deck to the support surface is supported on the angled plate of the apparatus with a header joist at the opposite, distal end of the deck resting on the ground prior to positioning the deck in its horizontal orientation relative to the vertical support surface. As the distal end of the deck is elevated to orient the deck horizontal relative to the support surface, the header joist at the proximal end of the deck slides downward and is received between the front and back plates of the hanger bracket apparatus secured to the support surface. The proximal end of the deck is supported by the bottom plate of the apparatus and a vertical support is inserted beneath the distal end of the deck to support the pre-assembled deck in a horizontal disposition relative to the vertical support surface.

20 Claims, 1 Drawing Sheet

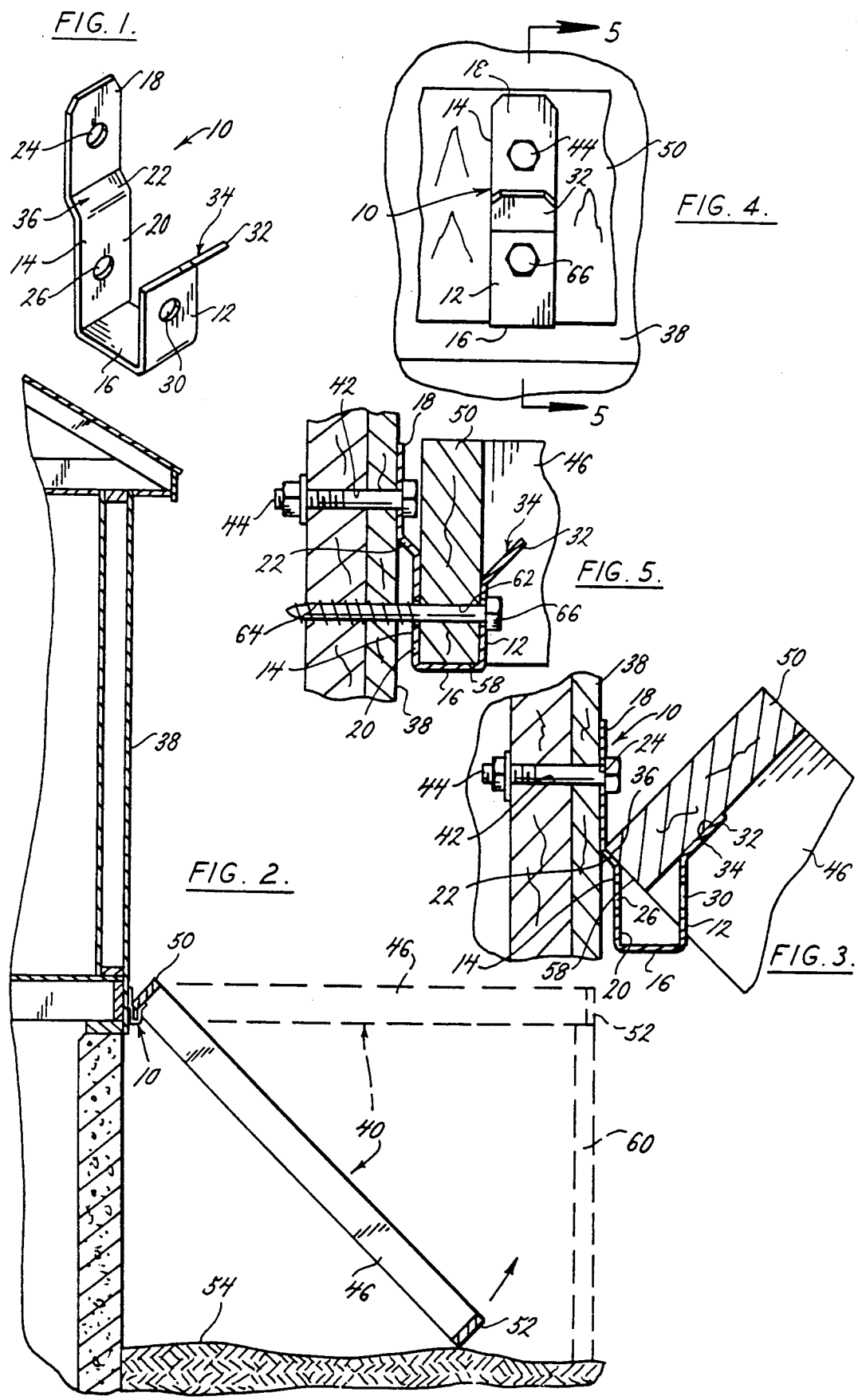

HANGER BRACKET APPARATUS FOR SECURING A JOIST MEMBER TO AN ELEVATED VERTICAL SUPPORT SURFACE

BACKGROUND OF THE INVENTION

(1) Field of the Invention

The present invention relates to a hanger bracket apparatus and a method for erecting and securing a framework of joist members to an elevated vertical support surface.

(2) Description of the Related Art

Various devices and methods have been employed in the prior art to erect wooden decks to the exterior walls of buildings. These decks are often constructed on site directly to the exterior building wall. The methods employed in constructing prior art decks often include constructing a framework of joists members directly to an external support surface of the building. This piecemeal construction of decks requires a substantial amount of time. If the workmen constructing the deck could first assemble the deck itself as a pre-assembled unit and then transport the pre-assembled deck to the job site for its assembly to the external support surface of the building, a considerable amount of time and effort could be saved. Such a method of construction could be easily employed with a deck that is assembled to a building at or near ground level. However, it would be much more difficult to employ this method of construction in assembling an elevated deck to an external support surface of a building.

Securing a pre-assembled elevated deck to a building would require several workmen or lifting machines to hold the pre-assembled deck in its desired elevated position relative to the external support surface of the building while the deck is secured to the building. Such a method of construction could only be employed by contractors having a substantial labor force or heavy lifting equipment with which to hold the pre-assembled deck in an elevated position while it is secured to the building. This method of construction could not be employed by small contracting companies with limited work forces, or by homeowners constructing their own decks to the sides of their homes. Moreover, even if the large work force or heavy lifting equipment were available to the contractor constructing the elevated deck, the contractor may find it easier to construct the deck in piecemeal fashion from the elevated support surface of the building rather than pre-assembling the deck and utilizing the large work force or heavy lifting equipment to hold the deck in an elevated position as it is attached to the building.

What is needed is a method of attaching a pre-assembled deck to an elevated external support surface of a building that does not require a large work force of laborers or heavy lifting equipment for its practice. What is also needed is an apparatus that would enable the attachment of a pre-assembled deck in a horizontal orientation to an elevated external support surface of a building employing the latter method.

It is an object of the present invention to provide a method of assembling a pre-assembled deck in an elevated horizontal position to an elevated vertical support surface on a building exterior.

It is a further object of the present invention to provide a hanger bracket apparatus that is secured to an elevated vertical support surface of a building exterior and facilitates the assembly of a pre-assembled deck in an elevated horizontal position to the elevated vertical support surface of the building exterior.

SUMMARY OF THE INVENTION

The hanger bracket apparatus of the present invention has a general U-shaped configuration with parallel front and back plates interconnected by a bottom plate. The bracket is constructed from a unitary piece of material, preferably metal. The front and back plates of the bracket are spaced apart by the bottom plate a sufficient amount to enable the insertion of a header joist of a pre-assembled deck between the front and back plates.

The back plate of the hanger bracket extends perpendicular from the bottom plate and is comprised of first and second sections. The first section is at the distal end of the back plate and the second section connects the back plate to the bottom plate. An intermediate section of the back plate interconnects the first and second sections. The intermediate section is angled relative to the first and second sections in a direction that positions the first section of the back plate a greater distance from the front plate of the bracket than the second section of the back plate. A pair of holes are provided through the back plate with one hole extending through the first and second sections of the plate. The holes serve as a means of fastening the hanger bracket to an external support surface of a building by preferably inserting threaded anchor bolt fasteners through the holes and into the external support surface of the building.

The bottom plate of the hanger bracket is formed integrally with the back plate of the bracket and extends at substantially a right angle thereto. The length that the bottom plate extends from the back plate is sufficient to enable the bottom plate to support the header joist of a pre-assembled deck to be supported by the hanger bracket.

The front plate of the hanger bracket is formed integrally with the bottom plate of the bracket and extends at substantially a right angle thereto, parallel with the hanger bracket back plate. A hole coaxial with the hole through the second section of the back plate is provided through the front plate. The hole through the front plate is also provided to accommodate a threaded fastener used in securing the hanger bracket to the external building support surface.

An angled plate is integrally formed with the front plate remote from the connection of the front plate to the bottom plate. The angled plate is disposed at an angle relative to the front and back plates and extends in a direction away from the back plate. The angular orientation of the angled plate is predetermined to be substantially perpendicular to the angular orientation of the intermediate section of the back plate.

The above-described hanger bracket apparatus of the present invention is employed in practicing the method of the present invention of assembling a pre-assembled deck in a horizontal elevated position to an elevated external support surface of a building.

A first step of the method of the invention involves securing at least one but preferably several of the hanger bracket apparatus to the elevated exterior support surface of the building. The number of hanger brackets secured to the support surface will depend on the size and weight of the pre-assembled deck to be secured to the support surface. The positions at which the hanger brackets are to be secured to the support surface are chosen depending on the desired elevation and orientation of the pre-assembled deck relative to the support surface of the building. The individual hanger brackets are secured to the support surface by first positioning the first section of the hanger bracket back plate flush against the support surface with the front plate and angled plate of the bracket extending outward from the surface. A hole is then drilled into the support surface concentric to the hole through the first section of the hanger bracket back plate. A bolt fastener is then inserted through the hole in the first section of the bracket and the hole drilled into the support surface and is secured by a nut to secure the hanger bracket in its desired position on the support surface. This process is repeated for each of the hanger bracket apparatus to be secured to the support surface of the building.

With the hanger bracket apparatus of the invention secured to the elevated external support surface of the building, the pre-assembled deck is next placed onto the hanger bracket apparatus and is supported on the hanger bracket apparatus in a horizontal disposition relative to the building. The deck is first oriented relative to the building with the joists of the deck all extending perpendicular to the external support surface of the building to which the hanger bracket apparatus were secured. This will position the header joists at opposite ends of the deck parallel with the external support surface of the building. The header joist at the proximal end of the deck to the building is then elevated while the header joist at the opposite distal end of the deck rests on the ground so that the deck is oriented at an angle. The elevated header joist is then positioned over the angled plate of the hanger bracket apparatus secured to the elevated external support surface of the building. The deck is then lowered so that an internal surface of the elevated header joist engages on the sloped surface of the angled plate of the hanger bracket apparatus and a bottom surface of the elevated header joist engages on the sloped surface of the intermediate sections of the hanger bracket apparatus. In this position of the pre-assembled deck, it is temporarily supported in an angular disposition with the elevated header joist of the deck being positioned at an angle relative to the second section of the back plate and the front plate of the hanger bracket apparatus.

Next, the distal end of the deck resting on the ground is elevated until the deck is substantially horizontal. Elevating the distal end of the deck causes the header joist supported on the angled plate and intermediate section of the hanger bracket apparatus to rotate relative to the hanger bracket apparatus and approach a position where the header joist will be substantially parallel to the second section of the back plate and the front plate of the hanger bracket apparatus. When the distal end of the deck has been elevated so that the deck is substantially horizontal to the ground, the header joist supported by the hanger bracket apparatus will slide over the sloped surfaces of the back plate intermediate section and the angled plate, and will fall into an inserted position between the front plate and the back plate second section where it will be supported by the bottom plate of the apparatus.

With the deck now oriented in a substantially horizontal position relative to the ground, temporary or permanent vertical supports are inserted beneath the deck at its distal end in order to support the deck in its horizontal disposition. A hole is then drilled through the header joist supported by the hanger bracket apparatus and into the support surface of the building concentric to the holes in the front plate and the back plate second section. A threaded fastener, preferably a screw threaded anchor bolt, is then inserted through the concentric holes of the front and back plates of the hanger bracket apparatus and the supported header joist of the deck, and into the hole drilled in the external support surface of the building to securely attach the pre-assembled deck in its horizontal disposition to the support surface of the building. Inserting the second fasteners through the hanger bracket apparatus, the header joist supported by the apparatus, and the elevated support surface of the building completes the assembly of the pre-assembled deck to the elevated surface of the building.

BRIEF DESCRIPTION OF THE DRAWINGS

Further objects and features of the present invention are revealed in the following detailed description of the preferred embodiment of the invention and in the drawing figures wherein:

FIG. 1 is a perspective view of the hanger bracket apparatus of the present invention;

FIG. 2 is a partial elevation view in section of the method of the present invention employed in assembling a horizontal elevated deck to an elevated external support surface of a building;

FIG. 3 is a partial side elevation view in section showing the details of assembling the deck to the hanger bracket apparatus of the present invention;

FIG. 4 is a partial front elevation view of the hanger bracket of the present invention secured to the support surface of a building and supporting a header joist; and FIG. 5 is a partial side elevation view of the hanger bracket of the present invention taken along the line 5—5 of FIG. 4.

DESCRIPTION OF THE PREFERRED EMBODIMENT

FIG. 1 shows the hanger bracket apparatus 10 of the present invention. The hanger bracket is used in erecting and securing a pre-assembled framework of decking joist members to an elevated vertical support surface. The present invention also includes the method involved in erecting and securing the framework of joist members in a horizontal orientation to the elevated vertical support surface employing the hanger bracket apparatus of the invention.

The hanger bracket apparatus 10 has a general U-shaped configuration with a front plate 12 and a back plate 14 interconnected by a bottom plate 16. The bracket is constructed from a unitary piece of material, preferably metal. The front and back plates extend in an upward direction parallel to each other from the bottom plate, and are spaced from each other a predetermined distance corresponding to the length of the bottom plate 16. The length of the bottom plate 16 and the spacing between the front and back plates 12, 14 is chosen to permit the insertion of a pre-assembled decking header joist between the front and back plates 12, 14 in a manner to be described.

The back plate 14 is divided into three sections: a first or top section 18, a second or bottom section 20, and an intermediate section 22 interconnecting the top and bottom sections. The top and bottom sections 18, 20 extend parallel to each other in the upward direction from the bottom plate 16, and the intermediate section 22 extends at an angle to the top and bottom sections. The intermediate section 22 is angled away from the front plate 12 as it extends upward from the bottom section 20 so that the top section 18 of the back plate 14 is spaced a greater distance away from the front plate 12 than is the bottom section 20 of the back plate 14. A pair of holes 24, 26 are provided through the top and bottom sections 18, 20, respectively, to accommodate fasteners in a manner to be described.

The bottom plate 16 is integrally formed with the back plate 14 and projects in a forward direction from the bottom edge of the back plate bottom section 20 substantially perpendicular to the back plate. The length at which the bottom plate 16 projects outward from the back plate 14 is predetermined to enable the bottom plate to extend completely beneath a header joist of a pre-assembled deck to be supported on the hanger bracket apparatus.

The front plate 12 is integrally formed with the bottom plate 16 and extends in an upward direction from a forward most end of the bottom plate. The front plate is substantially perpendicular to the bottom plate and parallel to the back plate 14. A hole 30 is provided through the front plate 12 and is positioned concentric to the second hole 26 through the bottom section of the back plate.

An angled plate 32 is formed integrally with the front plate 12 and extends at an angle from an uppermost edge of the front plate. The angled plate 32 extends in a forward direction away from the front plate 12 and the back plate 14. The angled plate 32 presents a sloped surface 34 at the top of the plate that is oriented substantially perpendicular to a second sloped surface 36 presented at the top of the intermediate section 22 of the back plate 14.

The above-described hanger bracket apparatus is used in the method of the present invention for erecting and securing a pre-assembled framework of joist members of a decking in a horizontal orientation to a vertical elevated support surface of a building. The bracket apparatus is designed to facilitate securing a pre-assembled deck to the elevated support surface by one or more persons and without the use of heavy lifting equipment. A primary benefit derived from the specific design of the hanger bracket apparatus is that it enables the home handyman to secure a pre-assembled deck in a horizontal orientation to an elevated vertical support surface of a building such as a home residence.

FIG. 2 shows one exemplary environment where the hanger bracket apparatus and the method of constructing a pre-assembled horizontal deck to an elevated vertical support surface of the present invention are employed. In this environment, the pre-assembled deck is assembled to an elevated vertical support surface of a house. It should be understood by those skilled in the art that the apparatus and method of the present invention may be employed in a variety of environments similar to that shown in FIG. 2, and that the environment of FIG. 2 is intended as being exemplary only and not limiting. For example, the apparatus and method of the invention may be employed in erecting a framework for floors, porches, awnings or similar structures.

In practicing the method of erecting and securing a pre-assembled deck framework of joist members to an elevated vertical support surface of the present invention, the hanger bracket apparatus 10 of the present invention is first secured to the vertical support surface from which the deck is to extend. As shown in FIGS. 2 and 3, the hanger bracket apparatus 10 is first positioned at the desired elevation against the vertical support surface 38. The number of hanger brackets 10 to be secured to the support surface 38 is dependent on the size and weight of the pre-assembled deck 40. Each of the hanger brackets 10 secured to the support surface 38 are positioned along a level line extending horizontally across the support surface so that the pre-assembled deck 40 supported by the hanger brackets 10 will also be horizontally leveled relative to the support surface. In securing the hanger bracket apparatus 10 to the vertical support surface 38, each of the hanger brackets is first placed in its desired position relative to the support surface 38 with the top section 18 of the back plate 14 of the apparatus pressed flush against the vertical support surface 38. A hole 42 is then drilled through the support surface 38 concentric with the first hole 24 through the top section 18 of the back plate 14. A nut and bolt fastener 44 is then inserted through the first hole 24 in the top section of the back plate 14 and the drilled hole 42 through the support surface 38 and is secured in place to securely hold the hanger bracket apparatus 10 against the support surface 38. With each of the hanger bracket apparatus 10 employed in the method of the invention secured to the vertical support surface 38 by a threaded fastener 44, the hanger bracket apparatus 10 are prepared to support the pre-assembled deck 40 in an elevated horizontal orientation relative to the support surface 38.

The pre-assembled deck 40 in the exemplary environment is rectangular and is comprised of a plurality of parallel joist members 46 secured at their opposite ends to header joists 50, 52. The pre-assembled deck 40 is carried to the area of the support surface 38 and a header joist 50 at the proximal end of the deck to the support surface 38 is elevated so that the deck is angled or inclined relative to the ground 54. With the header joist 52 at the distal end of the deck resting on the ground 54, the header joist 50 at the proximal end of the deck is lifted over the angled plate 32 of each hanger bracket and is placed on the sloped surface 34 of the angled plate 32 and the sloped surface 36 of the intermediate section 22 of the back plate 14. This places the deck 40 in an at-rest angled position prior to its being elevated to its horizontal orientation.

In the at-rest position, an interior surface 56 of the header joist 50 at the proximal end of the deck engages the sloped surface 34 of the angled plate 32, and a bottom surface 58 of the header joist at the proximal end of the deck engages the sloped surface 36 of the intermediate section 22 of the back plate 14. The at-rest position of the header joist 50 at the proximal end of the deck 40 is best seen in FIG. 3. In this position of the deck, the header joist 50 at the deck's proximal end can easily slide across both the sloped surface 34 of the angled plate 32 and the sloped surface 36 of the intermediate section 22 of the back plate 14 as the deck is rotated about its engagement with the hanger bracket 10 by elevating the deck to its horizontal orientation. Without the sloped surface 34 of the angled plate 32 and the sloped surface 36 of the intermediate section 22 of the back plate 14, the header joist 50 at the proximal end of the deck would bind against the upper edge of the front plate 12 as the deck is rotated to its horizontal position, making it difficult to employ the method of the present invention in securing the pre-assembled deck 40 to the support surface 38 without the sloped surfaces 34, 36 on the bracket.

From the at-rest position of the deck shown in FIGS. 2 and 3, the pre-assembled deck is then rotated about the engagement of the header joist 50 at the proximal end of the deck with the hanger bracket apparatus 10 to its elevated horizontal position 40' shown in phantom lines in FIG. 2. The deck is rotated about its engagement with the hanger bracket apparatus by elevating the header joist 52 at the distal end of the deck. As the deck is rotated about its engagement with the hanger bracket apparatus 10, the interior surface 56 of the header joist 50 at the proximal end of the deck slides across the sloped surface 34 of the angled plate 32, and the bottom surface 58 of the header joist slides across the sloped surface 36 of the intermediate section 22 of the back plate of the hanger bracket apparatus. The sliding of the header joist 50 across the sloped surfaces 34, 36 continues until the header joist is positioned substantially parallel with the front plate 12 and the bottom section 20 of the back plate 14. In this position of the header joist 50 relative to the front and back plates 12, 14 of the hanger bracket apparatus, the header joist 50 then slides downward and is received between the front plate 12 and the bottom section 20 of the back plate 14 and is supported on the bottom plate 16 of the hanger bracket apparatus. A vertical support column 60 of some fashion is then placed beneath the header joist 52' at the distal end of the pre-assembled deck 40' to support the deck in its horizontal orientation suspended by the hanger bracket apparatus 10 on the vertical support surface 38.

With the deck 40' now supported in its horizontal orientation, a hole is then drilled through the header joist 50 at the proximal end of the deck concentric to the hole 30 in the front plate 12 and the hole 26 in the back plate 14 of the hanger bracket apparatus 10. A hole 64 is also drilled through the vertical support surface 38 concentric to the hole 62 through the header joist 50 and the holes 30, 26 through the front plate 12 and the back plate 14 of the hanger bracket apparatus 10. A threaded fastener securing means such as a screw threaded anchor bolt 66 is then inserted through the concentric holes of the front and back plates 12, 14 of the hanger bracket apparatus, the joist member 50, and the vertical support surface 38 to complete the securing of the pre-assembled deck 40' to the, elevated vertical support surface 38 in a horizontal disposition relative to the surface.

As best seen in FIG. 5, with the pre-assembled deck 40' secured to the elevated vertical support surface 38 in its horizontal disposition relative to the surface, the header joist 50 at the proximal end of the deck is spaced a short distance from the support surface 38. This is due to the angle of the intermediate section 22 of the back plate 14 connecting the first or top section 18 of the plate to the second or bottom section 20 of the plate. The angled intermediate section 22 of the back plate not only facilitates the assembly of the pre-assembled deck into the hanger bracket apparatus 10, but also provides the clearance 70 between the header joist 50 at the proximal end of the deck and the vertical support surface 38. The clearance 70 accommodates the head of the threaded fastener 44 securing the hanger bracket apparatus 10 to the vertical support surface 38 as can best be seen in FIG. 5. The clearance 70 also enables rainwater to drain downward along the vertical support surface 38 between the surface and the pre-assembled deck 40' without building up on top of the deck. If so desired, a spacing shim (not shown) may be inserted between the vertical support surface 38 and the bottom section 20 of the back plate 14 to provide additional support between the pre-assembled deck 40' and the support surface 38.

While the present invention has been described by reference to specific embodiments, it should be understood that modifications and variations of the invention may be constructed or practiced without departing from the scope of the invention defined in the following claims.

What is claimed is:

1. A hanger apparatus for erecting and securing a joist member to a support surface, the apparatus comprising:

a hanger bracket having a general U-shaped configuration, the bracket having a bottom plate and spaced front and back plates interconnected by the bottom plate, the back plate being adapted to be secured to the support surface and the space between the front and back plates enabling insertion of the joist member therebetween to support the joist member on the bottom plate of the hanger bracket in a substantially parallel orientation relative to the support surface; and an angled plate connected to the front plate and extending at an angle therefrom, the angled plate including means for supporting the joist member in an angled orientation relative to the support surface, and the angled plate including means for directing he joist member into a position between the front and back plates as the joist member is moved from the angled orientation relative to the support surface to a parallel orientation relative to the support surface.

2. The apparatus of claim 1, wherein:
   the front and back plates are parallel and the angled plate extends at an angle away from the back plate.

3. The apparatus of claim 1, wherein:
   the space between the front and back plates is predetermined so that the front and back plates engage opposite sides of the joist member when the joist member is inserted between the front and back plates and is supported on the bottom plate.

4. The apparatus of claim 1, wherein:
   the support surface is an elevated support surface; and the joist member is a header joist of a pre-assembled deck.

5. The apparatus of claim 1, wherein:
   the hanger bracket is formed from a single piece of metal.

6. The apparatus of claim 1, wherein:
   the back plate is formed in first and second sections with the first section being spaced a first distance from the front plate and the second section being spaced a second distance from the front plate.

7. The apparatus of claim 6, wherein:
   the first distance is larger than the second distance, and a difference between the first and second distance provides a clearance between the first section of the back plate and the joist member when the joist member is inserted between the front and back plates.

8. The apparatus of claim 7, wherein:
   the first section of the back plate is adapted to be secured to the support surface, and the clearance between the first section and the joist member provides a clearance between the joist member and the support surface.

9. The apparatus of claim 7, wherein:
   the first section of the back plate is adapted to be secured to the support surface by a fastener means inserted through the first section and into the support surface, the clearance between the first section and the joist member providing a clearance for the fastener means.

10. The apparatus of claim 6, wherein:
the back plate is formed with an intermediate section interconnecting the first and second sections, the intermediate section being angled relative to the first and second sections thereby providing a sloped surface to support the joist member prior to insertion between the front and back plates and to enable sliding of the joist member across the second sloped surface as it is inserted between the front and back plates.

11. A hanger apparatus for securing a joist member to a support surface, the apparatus comprising:
a bracket having a general U-shape with a bottom plate and spaced front and back plates interconnected by the bottom plate, the space between the front and back plates enabling insertion of the joist member therebetween to be supported on the bottom plate, the back plate being formed in first and second sections with the first section being spaced a first distance from the front plate and the second section being spaced a second distance from the front plate;
and means interconnecting the first and second sections of the back plate for supporting the joist member in an angled orientation relative to the support surface, and for directing the joist member into a position between the front and back plates.

12. The hanger apparatus of claim 11, wherein:
the first distance is greater than the second distance, a difference between the first and second distance providing a clearance between the first section of the back plate and the joist member when the joist member is inserted between the front and back plates.

13. The hanger apparatus of claim 12, wherein:
the first section of the back plate is adapted to be secured to the support surface by a fastener means inserted through the first section and into the support surface, the clearance between the first section and the joist member providing a clearance for the fastening means.

14. The hanger apparatus of claim 12, wherein:
the first section of the back plate is adapted to be secured to the support surface, the clearance between the first section and the joist member providing a clearance between the support surface and the joist member.

15. The hanger apparatus of claim 11, wherein:
the means for directing the joist member includes an intermediate section of the back plate interconnecting the first and second sections, the intermediate section being angled relative to the first and second sections thereby providing an angled surface to support the joist member in the angled orientation prior to its insertion between the front and back plates.

16. The hanger apparatus of claim 11, wherein:
an angled plate is connected to the front plate and extends at an angle therefrom, the angled plate providing a sloped surface to support the joist member prior to insertion between the front and back plates and enabling sliding of the joist member across the sloped surface as it is inserted between the front and back plates of the hanger bracket.

17. A hanger apparatus for erecting and securing a joist member to a vertical support surface, the apparatus comprising:
a hanger bracket, the hanger bracket having first means for securing the hanger bracket to the support surface;
the hanger bracket having second means for supporting the joist member in an angled orientation relative to the support surface, and for causing the joist member to move to a position where the joist member is in a substantially parallel orientation relative to the support surface.
and the hanger bracket having third means for holding the joist member in a substantially parallel orientation relative to the support surface.

18. The apparatus of claim 17, wherein:
the first means includes a back plate to be secured against the support surface, and the third means includes a bottom plate secured perpendicular to the back plate and a front plate secured perpendicular to the bottom plate and oriented parallel to the back plate, the joist member being held in a substantially parallel orientation relative to the support surface between the front and back plates and on top of the bottom plate.

19. The apparatus of claim 18, wherein:
the second means includes an angled plate secured to the front plate, the angled plate supporting the joist member thereon in an angled orientation relative to the support surface.

20. The apparatus of claim 19, wherein:
the second means includes an angled section of the back plate, the angled section supporting the joist member thereon in an angled orientation relative to the support surface.

* * * * *